US Patent Office  
3,136,728  
Patented June 9, 1964

3,136,728  
PROCESS OF DECREASING THE SALT CONTENT OF AN ACIDIC SILICA HYDRO-ORGANOSOL  
Wilson H. Power, Des Peres, Mo., assignor to Monsanto Company, St. Louis, Mo., a corporation of Delaware  
No Drawing. Filed Sept. 19, 1958, Ser. No. 761,959  
9 Claims. (Cl. 252—306)

The present invention relates to acidic silica sols which are substantially free of salts, and to processes of producing acidic silica sols which are free of salts or have a very low salt content. The present invention also relates to silica aerogels which are substantially free of electrolyte, and to processes of producing silica aerogels which are free of electrolyte or have a very low electrolyte content.

It has been proposed heretofore in the United States Patent No. 2,285,477 to John F. White, patented June 9, 1942, to prepare acidic silica alcosols and silica aerogels from silica alcosols. According to this White patent an acidic aqueous colloidal silica solution is first prepared by mixing a mineral acid and an alkali silicate solution at a pH of about 1.8 to 4.5. Before the resulting sol has solidified to the gel form, an organic solvent (e.g., ethanol), miscible with water, is added to give a mixed hydro-organosol. The addition of this organic solvent and cooling of the sol causes a substantial portion of the inorganic salt to precipitate, and upon removal of the precipitated salt a sol is obtained which varies in stability depending on the pH of the sol and the temperature at which it is stored. In any event the sols are considerably less stable than alkaline silica aquasols. The White alcosols may be autoclaved in the same way that the alco or other gels are treated by the process of United States Patent No. 2,093,454 to Samuel S. Kistler, patented September 21, 1937, to give an aerogel product.

The White hydro-organosols contain varying amounts of inorganic salt depending on the acid and silicate employed, the concentration of organic solvent and silica in the sol, the temperature of the sol and other factors. However, the minimum inorganic salt concentration in the sol is about 0.1 to 0.3% by weight based on the sol. This salt content is obpectionable for certain uses of the sol. Moreover, when the sol is autoclaved to form a silica aerogel, the minimum quantity of inorganic salt is about 1 to 3% by weight on the aerogel. Due to its relatively high electrolyte content, the resulting aerogel is not entirely satisfactory as a filler in silicone rubbers which are to be used as electric insulating materials. The above remarks also apply to the acidic hydro-organosols produced by the process of the United States Patent No. 2,285,449 to Morris D. Marshall, patented June 9, 1942, and to the aerogels prepared from such sols.

In the Kistler patent referred to above, silica aerogels are prepared from silica alcogels. According to the Kistler process a silica hydrogel is first prepared from sodium silicate acidified with sulfuric acid. The silica hydrogel is washed with water and the water in the hydrogel is then replaced by a water-miscible liquid having a lower critical temperature than water, for example, ethanol, to form a silica alcogel. This alcogel is charged to an autoclave which is nearly filled with liquid, the liquid being the same as contained in the alcogel, and the autoclave is then closed. The whole mass in the autoclave is then slowly heated, (only enough vapor being released to prevent excessive pressures but not enough to produce substantial drying of the gel) until the temperature exceeds the critical temperature of the liquid in the autoclave. The gas is then released at a rate insufficient to damage the gel. The resulting gel, which is an aerogel, occupies substantially the same volume as the alcogel from which it is prepared.

The aerogels produced according to the above Kistler patent contain some quantities of salts which make them generally unsuitable for certain uses, particularly where the material is used in electrical insulators. This is due to the circumstance that the starting hydrogel contains salt which is held tenaciously by the gel structure and it has been found to be virtually impossible to remove all or substantially all of the the salts present in the silica hydrogel by washing with water using conventional techniques. It has also been found that it is impossible to rid the hydrogel of metallic cations by using wash water of ordinary hardness because the silica hydrogel adsorbs metallic cations from such wash water.

The present invention relates to an improvement on the processes and products disclosed in the Marshall and White patents (as well as the Kistler patent) hereinbefore referred to. In accordance with the present invention, it is possible to remove all or substantially all of the salt from an acidic silica hydro-organosol, and it is also possible to prepare therefrom a silica aerogel which is free or substantially free of electrolytes. The resulting aerogels have a utility in electrical insulating compositions which is not shared by the silica aerogels of the prior art referred to above.

It is one object of this invention to provide a process of producing acidic silica hydro-organosols, particularly acidic silica ethanol-aquasols, which are free or subtantially free of salts.

It is a further object of this invention to provide acidic silica hydro-organosols, particularly acidic silica ethanol-aquasols, which are free or substantially free of salts.

It is a further object of this invention to provide a process of producing silica aerogels which are free or substantially free of electrolytes from acidic silica hydro-organosols, particularly acidic silica ethanol-aquasols.

It is a further object of this invention to provide silica aerogels which are free or substantially free of electrolytes.

Still further objects and advantages of this invention will become apparent from the following description and the appended claims.

The objects of this invention are attained, in general, by removing all or substantially all of the residual dissolved salt in an acidic silica hydro-organosol by contacting such a sol with a strong cation-exchange material which is capable of absorbing metallic cations from an acidic hydro-organo solution and with a water-insoluble salt of a volatile organic acid and a water-insoluble weak anion-exchange material containing a plurality of salt-forming nitrogen atoms, and then, if desired, removing the liquid phase of the sol without subjecting the resulting gel to compressive forces which would cause appreciable shrinkage of the gel. In carrying out the present invention, it is possible to contact the electrolyte-containing silica hydro-organosol with the anion and cation-exchange materials in any desired sequence, which is intended to include simultaneous use of both exchange materials. Ordinarily pH control of the sol during contact with the exchange materials is not necessary as the exchange materials used provide a final sol having the proper pH in most instances. However, in those instances where the initial sol is first contacted with the anion-exchange material and then with the cation-exchange material, it is necessary to control the extent of contact with the anion-exchange material so that the pH of the sol does not exceed 4.8 as will be described in greater detail hereinafter.

Although it is known that salts may be removed from aqueous solutions thereof by contacting such solutions with cation and anion-exchange materials, it could not be predicted or foreseen that the removal of salts from acidic silica hydro-organosols could be accomplished in this manner due to the presence of organic liquid, due to the tendency of such sols to gel rapidly with relatively slight upward changes in pH and also due to the tendency of the silica or silicic acid in such sols to be absorbed on the anion-exchange resin, particularly when it is considered that certain anion-exchange resins have been used to remove silica from aqueous solutions. However, the present invention provides a practical process for removing salts from such sols which avoids gelation of the sol for practical periods of time and minimizes the absorption of colloidal silica or silicic acid by the anion-exchange material.

The initial or starting silica hydro-organosols employed in the invention may be prepared according to the processes described in the White and Marshall patents hereinbefore referred to. The processes of these patents comprise, in general, first forming an acidic silica aquasol having a pH between 1.8 and 4.5, preferably 1.8 to 4.0, by acidifying a water-soluble alkali silicate such as sodium silicate with a mineral acid such as sulfuric acid, in the proper proportions to give such a pH, and then adding a water-miscible organic solvent or liquid such as ethanol to the aquasol to precipitate a substantial portion of the salt formed by the reaction of the silicate and the acid (as in the above Marshall patent), which sol may be cooled to precipitate further quantities of salt (as in the above White patent). The salt is then separated from the sol by any suitable removing operation such as filtration, centrifugation or the like, to form the starting sols of this invention. These sols contain at least 0.1% by weight of salt and can contain as much as 5% by weight of salt in some instances. Even the minimum amount (0.1%) of salt makes such sols unsatisfactory for some uses, for example, in the formation of coatings or films where low electric conductivity or low water sensitivity is required. Such initial sols are also unsatisfactory for the preparation of aerogels which must be free or substantially free of electrolytes for certain end uses. The initial sols are usually prepared at a temperature between 3 and 12° C. However, they can be contacted with the cation and anion-exchange materials hereinafter described at a temperature below 30° C., for example, between 0 and 30° C., although temperatures of 0–20° C. are more satisfactory. The initial sols preferably have a pH between 2 and 4, and generally have an $SiO_2$ content, as silicic acid, of about 4 to 12%, preferably 5 to 11% by weight.

In a preferred form of this invention the starting silica hydro-organosols are prepared by reacting an aqueous solution of sodium silicate and aqueous sulfuric acid at a temperature between about 0 and 15° C. in such proportions and concentrations to provide an acidic silica aquasol having a pH of about 2 to 4 and containing sodium sulfate and from about 12 to 20% by weight of $SiO_2$ as silicic acid. The aquasols having a silica content over 17% by weight generally must be kept at 0–5° C. to prevent rapid gelation.

The silica aquasol thus obtained is maintained at a temperature of about 0 to 15° C. and a water-miscible organic liquid such as ethanol is mixed therewith to form a silica hydro-organosol containing from about 25 to 60% by weight of the organic liquid and from about 5 to 11% by weight of $SiO_2$ as silicic acid. The sodium sulfate is substantially insoluble in the above sol and is thus precipitated to a substantial extent. On removal of this sodium sulfate by centrifugation, filtration or the like, a sol is obtained which contains about 0.1 to 0.6% by weight $Na_2SO_4$ depending on the concentration of the organic liquid in the sol and the temperature of the sol.

The water-miscible organic liquid employed in preparing the initial or starting sols used in this invention is substantially neutral and can have a boiling point above that of water at atmospheric pressure if the sol is to be used, for example, in the treatment of textiles or paper. For example, the higher boiling water-miscible organic liquids such as diethylene glycol, ethylene glycol, 2-ethoxyethanol, methoxyethanol, 2-butoxyethanol, monomethyl ether of diethylene glycol, monoethyl ether of diethylene glycol or monobutyl ether of diethylene glycol or the like may be employed in such instances. With this type of organic liquid those which consist of carbon, hydrogen and oxygen atoms are preferred. Water-miscible organic liquids which are substantially neutral and have a boiling point below that of water at atmospheric pressure can also be used in the sol when the sol is employed for such end uses. If the sols are to be employed to produce aerogels, it is necessary to employ water-miscible organic liquids, preferably those consisting of carbon, hydrogen and oxygen atoms, which have a boiling point below that of water at atmospheric pressure. As examples of suitable liquids of this category may be mentioned methanol, ethanol, isopropanol, tertiary butyl alcohol, acetone or the like. The preferred organic liquids or diluents are ethanol and acetone.

As is pointed out previously, in accordance with this invention the residual or dissolved salt in the starting silica hydro-organosols described above is removed by contacting the sol with a water-insoluble strong cation-exchange material which is capable of exchanging hydrogen ions for metallic cations in an acidic hydro-organo solution whereby the metallic cations of the salt are taken up by the cation-exchange material which releases hydrogen ions to the solution, and by contacting the sol with a water-insoluble salt of a volatile organic acid and a water-insoluble weak anion-exchange material having a plurality of salt-forming nitrogen atoms which material is capable of exchanging volatile organic acid anions for mineral acid anions in an acidic hydro-organo solution. The resulting sol contains less than 0.05%, usually less than 0.025%, and preferably less than 0.01%, by weight of salt and also contains a volatile organic acid which is driven off, in the preparation of an aerogel, at temperatures near the critical temperature of the liquid phase of the sol to form aerogels containing less than 0.5%, usually less than 0.25%, and preferably less than 0.1% by weight of electrolyte.

The reaction between the metallic cations in the sol and the cation-exchange material may be represented by the following equation:

$$M^+ + HR \rightarrow MR + H^+$$

where $M^+$ is a metallic cation and R is the water-insoluble portion of the cation-exchange material. It is apparent from this equation that the cation-exchange material employed herein is used in the hydrogen form or operated on a hydrogen cycle. When this material is no longer capable of removing metallic cations from the sol it is regenerated by treatment with an acid such as sulfuric or hydrochloric acid to convert it to the hydrogen form. The cation-exchange material must be a "strong cation-exchange material" by which term is meant a material which will remove metallic cations from hydro-organo solutions at a pH as low as 2. As examples of strong cation-exchange materials which may be used may be mentioned water-insoluble phenolic methylene sulfonic resins, for example, those obtained by reacting phenol, formaldehyde and sulfuric acid or an alkali sulfite such as those described in U.S. 2,477,328 and U.S. 2,466,675; water-insoluble polymerized vinyl aromatics containing nuclear sulfonic acid groups (such as those described in U.S. 2,366,007) or sulfuric acid groups attached to aliphatic portions of the polymers, and the like. As examples of commercially available materials which can be used may be mentioned "Dowex" 50 (which is described in vol. 69, p. 2830, of the Journal of the American Chemical Society) or "Amberlite" IR–120, which contain nuclear sulfonic acid groups attached to a water-insoluble styrene-divinylbenzene copolymer resin. In general the cation-exchange materials which have a titration curve similar to that shown in FIGURE 1, on page 88 of "Analytical Chemistry," volume 21, (1949), are satisfactory.

The reaction between the mineral acid anions in the sol and the salt of the volatile organic acid and a weak anion-exchange material may be represented by the following equation:

$$A^- + R_1-(NH_2)_x \cdot Y \rightarrow R_1-(NH_2)_x \cdot A + Y^-$$

where $A^-$ is the anion of a mineral acid, for example $Cl^-$, $SO_4^{--}$, $HSO_4^-$ or $PO_4^{---}$, $R_1-(NH_2)_x$ is the water-insoluble portion of an anion-exchange material and Y is a volatile organic acid such as formic or acetic acid. Thus, the above equation illustrates the exchange of a mineral acid anion in the hydro-organosol for a volatile organic acid anion by the use of a volatile organic acid salt of a weak base anion-exchange material composed of a plurality of salt-forming nitrogen atoms, for example, amino groups or imino groups. The anion-exchange material must be in the form of "a volatile organic acid salt of a weak base anion exchanger" by which term is meant a material which will readily remove mineral acid anions from a hydro-organo solution at a relatively low pH but will only remove such anions slowly as the pH approaches 7.0. Strong anion-exchange materials cannot be used as they will adsorb silica as well as mineral acid anions from the sol.

The base form of weak-anion-exchange materials are not generally suitable for the removal of residual salts from acidic silica hydro-organosols under all conditions, because of the difficulty encountered with gelation of the sol, unless the pH of the sol is properly controlled during contact with such materials. A suitable process for using the base form of weak anion-exchange materials for the removal of residual salt from such sols is described and claimed in my copending application Serial No. 547,835, filed November 18, 1955, now abandoned. In accordance with the present invention, it is possible to employ the water-insoluble salt of a volatile organic acid and a weak anion-exchange material, as mentioned above, to obtain the proper pH values in the sol, and the resulting sol is sufficiently fluid for further operations such as pumping, temporary storage and the like. Also, the conversion of the resulting sol to an aerogel results in the vaporization or decomposition of the volatile organic acid in the sol so that the aerogel can be obtained in an essentially neutral state, if desired.

As examples of weak anion-exchange materials which can be employed in this invention may be mentioned the volatile organic acid salts of weak anion-exchange materials such as water-insoluble copolymers of styrene and divinylbenzene containing nuclear amine groups or polyalkylamine groups (such as those described in U.S. 2,366,008), water-insoluble polymerized condensation products of an aromatic amine, for example, meta-phenylene diamine, and formaldehyde and water-insoluble polymerized reaction products of a polyamine such as ethylene diamine, diethylene triamine and the like with phenol and formaldehyde (such as those described in U.S. 2,341,907). As examples of commercially available weak anion-exchange materials which can be converted to the salt form with volatile organic acids may be mentioned "Dowex" 3 or "Amberlite" IR-45 which contain polyalkylamine groups attached to a water-insoluble reaction product of a polyalkylamine and a chloromethylated styrene-divinylbenzene copolymer resin (such as those described in U.S. 2,591,574). In general, the suitable weak anion-exchange materials are those which have a titration curve similar to that of FIGURE 6 on page 8 of "Encyclopedia of Chemical Technology," volume 8 (1952), published by the Interscience Encyclopedia, Inc., New York. Such materials contain a plurality of $-NH_2$, $-NHR$ or $-NR_2$ groups, where R is an aliphatic radical. The volatile organic acids used to convert such materials to the salt form include formic acid, acetic acid, propionic acid and the like.

When the anion-exchange material has been used to the extent that it is no longer capable of removing mineral acid anions of a salt from the sol efficiently, it can be regenerated, for example, by treatment with ammonia to convert the anion-exchange material to the base form and then by treatment with a volatile organic acid of the type described above to convert the material to the weak acid salt form. When this is done the anion-exchange material may be used for further mineral acid anion removal from the starting hydro-organosols.

In carrying out the processes of this invention, the pH of the hydro-organosol is important during removal of the cations and anions of the salt in the sol in order to avoid gelation of the sol, and also to remove such cations and anions efficiently and as completely as possible. Ordinarily, the pH of the sol during contact with the exchange materials will be in the proper range because of the exchange materials employed herein. However, when the sol is first contacted with the anion-exchange material care must be taken, as will be explained below, to remove the sol from the anion-exchange material before the sol exceeds a certain maximum pH value, that is, a pH not in excess of 4.8.

If the starting hydro-organosol is contacted with the anion-exchange material and then with the cation-exchange material, the pH of the starting sol rises to about 4.4 to 4.8 during contact with the anion-exchange material. This pH would ordinarily be too high due to the danger of gelation, but since the mineral acid anion of the salt in the sol is exchanged for the anion of the volatile organic acid the resulting sol is more stable and does not gel as rapidly as the sols containing only mineral acid anion. In fact, this sol has a stability of 12 hours or more at a temperature below 20° C. and thus is sufficiently fluid to be contacted with the cation-exchange material prior to gelation. The subsequent contacting of the sol with the cation-exchange material reduces the pH of the sol with the removal of metallic cations so that the pH is below 4 and usually between about 1.8 and 3.3, preferably 2.5 to 3.3. This constitutes a distinct advantage since the cation-exchange material is employed initially at the higher pH of the sol and this results in more efficient removal of the metallic cations than is the case where the cation-exchange material is employed initially with a sol at a lower pH. Although this procedure involves the initial formation of a sol with a relatively high pH and the attendant danger of rapid gelation, both the anion and cation-exchange materials are employed at a favorable efficient operating range of pH.

When the above procedure is employed, the sol may be used directly, without further processing, for certain applications. When the sol is dried at temperatures up to about 140° C. the silica deposited is substantially free of electrolyte since the volatile organic acid is driven off. The sol may also be used directly in the manufacture of aerogels without any further processing.

When the starting hydro-organosol is first contacted with the cation-exchange material the removal of metallic cations therefrom causes a decrease in the pH down to about 1.8 to 2.5. At these pH values the sol is quite stable, for example, for a period of about 1 week or more at temperatures below 30° C. Therefore, there is little danger of gelation of the sol. However, at these low pH values the removal of the last traces of the metallic cations is relatively slow and the cation-exchange material does not operate at maximum efficiency. When the resulting sol is contacted with the anion-exchange material the pH of the sol increases somewhat due to removal of mineral acid anions from the sol by the anion-exchange material. However, the pH of the sol is generally within the range of 2.8 to 4.0, and thus of suitable stability.

The starting hydro-organosol can also be contacted with a mixture of the cation and anion-exchange material until all or substantially all of the ions of the salt in the sol have been removed by the exchange materials. In carrying out this procedure the pH of the sol is generally within the range of about 2.5 to 4.0, preferably 3.0 to 4.0, and contact is maintained until the sol contains less than 0.05% by weight of the salt. In this embodiment of the invention, the starting hydro-organosol is preferably passed upwardly or downwardly through a mixed bed of the anion or cation-exchange material, the rate of flow being controlled so as to maintain the pH of the effluent between 2.5 to 4.0, but preferably between 2.7 and 3.5 to obtain favorable efficiency of each exchange material. In this manner the salt content of the starting sol is lowered so that it is less than 0.05% by weight of the sol.

When the mixed bed is exhausted, that is, not capable of removing further quantities of salt efficiently, it may be regenerated by first separating the anion and cation-exchange material. This may be accomplished by a hydraulic separation which takes advantage of the difference in density of the two materials. After the anion and cation-exchange materials have been separated from each other they may be individually regenerated as hereinbefore described and then mixed together for further treatment of a starting hydro-organosol.

The starting hydro-organosol can be contacted with the ion-exchange materials employed herein in a variety of ways. For example, the exchange material can be added to the sol and then removed from the sol by filtration, centrifugation or the like, or the exchange material can be suspended in a moving stream of the sol in the form of a fluidized bed, or the sol can be passed through a fixed bed of the exchange materials. The latter procedure is preferred since it enables more accurate and efficient control of the pH of the sol. When a fixed bed or beds of the exchange material are used, the movement of the sol through the bed can be downward or upward. However, from the standpoint of simplicity of operation, it is desirable to allow the sol to flow downwardly by gravity through the bed of exchange material, but this is not necessarily the most efficient procedure. If the hydro-organosol is cloudy or contains suspended matter, it is preferred to remove the cloudy material or suspended matter therefrom prior to passing it through a bed of the exchange material. This is suitably accomplished in the case of sols containing particles of gel or other solid matter larger than colloidal size by filtration, centrifugation or the like, and is preferably done by passing the sol through a sand filter.

When it is desired to form a silica aerogel from the hydro-organosol from which the salt has been removed by the use of the anion and cation-exchange materials, such sol can be charged to an autoclave and the liquid phase removed therefrom as described in the Marshall patent hereinbefore referred to. The liquid phase of the sol can also be removed continuously from the sol to form an aerogel by pumping the sol under pressure into a heated tube, the other end of which is provided with a hot let-down valve, in which tube the sol is heated to or above the critical temperature of the liquid phase of the sol, and the silica aerogel and vapors formed in the tube are released through the let-down valve and then separated from each other while preventing condensation of the vapors on the aerogel.

In general, silica aerogels are prepared from the acidic silica hydro-organosols which are free or substantially free of salts by first heating such sols in a pressure-resistant vessel. When such sols are charged to a pressure-resistant vessel and then heated, the sol is first converted to a gel in situ and the removal of the liquid phase from the gel is accomplished in the same manner as in the case of an hydro-organogel, for example, as in the process of the Kistler patent hereinbefore referred to. Thus the liquid phase is removed without subjecting the hydro-organogel formed in situ to a substantial compressive liquid-solid interface.

In carrying out the removal of the liquid phase from the gel formed in situ, it is necessary to heat the gel in a closed zone or system, in which the pressure may be controlled as desired, for example, in an autoclave, until the temperature of the vapor of the liquid phase of the gel is near or above the critical temperature of the liquid phase. The temperature of the gel is raised until it is at least at the temperature where substantially all of the liquid phase of the gel has been converted to a vapor, and thereafter vapor may be released slowly from the closed system so as not to injure the gel structure. This temperature may be about 30° C. below the critical temperature of the liquid phase of the gel or near or at the critical temperature or above the critical temperature of the liquid phase of the gel, depending on the particular organic liquid and concentration thereof present in the liquid phase of the gel. The temperature is then maintained or raised, as desired, while releasing vapor slowly until essentially all of the vapor is released from the closed system. Although the temperature may be as much as 30° C. below the critical temperature of the liquid phase of the gel, satisfactory results may be obtained by operating at such a temperature. On the other hand, some shrinkage of the gel does occur, and it is preferred to avoid this shrinkage by operating at least at the critical temperature of the liquid phase of the gel. Higher temperatures may also be used, for example, temperatures up to about 500° C., but it is preferred not to exceed a temperature of about 450° C.

In charging the silica hydro-organosol to the closed system prior to heating, it is desirable that the sol should occupy about 50 to 75% of the volume of the system. If the volume occupied is too small there is a tendency for excessive shrinkage during heating. If the volume occupied is too large, on the other hand, there is a danger that the vessel or autoclave may be damaged due to hydrostatic pressure.

In general, the silica aerogels prepared according to the processes of this invention have physical properties which are very similar to the aerogels of the prior art. However, they are distinctive from prior art aerogels in that they are free or substantially free of electrolyte, the term "electrolyte" being used to denote residual acid as well as salts. Thus, the silica aerogels of this invention generally contain less than 0.4% by weight and usually less than 0.1% by weight of electrolyte, whereas such prior art aerogels usually contain a minimum of 1% by weight of salts. The aerogels of this invention can be used in the normal way, that is, for thermal insulation, for flatting lacquers and varnishes, for thickening greases and the like, but they are especially useful for applications where the low electrical conductivity of such aerogels is of importance. Thus, these aerogels are particularly useful as reinforcing fillers in silicone rubbers or in other rubbers which are used as electrical insulators.

A further understanding of the methods of the present invention will be obtained from the following specific examples which are intended to illustrate the invention, but not to limit the scope thereof, parts and percentages being by weight unless otherwise specified.

*Example 1*

Seven and one-half liters of an acidic silica ethanol-aquasol at a temperature of 5° C. and having a colloidal silica content of 9.7%, a sodium sulfate content of 0.3%, an ethanol content of 50%, a water content of 40% and containing sufficient free sulfuric acid to provide a pH of about 2.9 (glass electrode), was first filtered through a sand filter and then passed downwardly by gravity flow through a 140 milliliter column of the hydrogen form of water-insoluble beads of a copolymer of styrene and divinylbenzene, which copolymer contains nuclear sulfonic acid groups, at a rate of approximately 10 milliliters per minute. The cation-exchange copolymer had a capacity of 4.25 me. (milligram equivalents) per gram. The pH of the ethanol-equasol was lowered to about 2.0 (glass electrode) by this treatment, and this effluent substantially free of sodium as evidenced by the fact it gave a negligible flame test for sodium.

One gallon of the effluent from the cation-exchange copolymer or resin was placed in a glass container and was vigorously stirred, while a total of 220 grams of the formic acid salt of "Amberlite" IR–45 (a weak anion-exchange material consisting of a water-insoluble reaction product of diethylene triamine and a chloromethylated styrene-divinylbenzene copolymer and containing a plurality of polyalkylamine groups) and having a capacity of 6.0 me. per gram were added. When the pH of the sol reached a value of 3.1 (glass electrode) stirring was discontinued and the anion-exchange material was separated from the sol by filtration through a 60 mesh sieve. The resulting sol gave no visible precipitate when a portion thereof was tested with barium chloride solution and contained less than 0.01% by weight of sodium sulfate. The amount of silica adsorbed by the anion-exchange material was negligible.

The sol thus obtained was charged to an autoclave until 75% of the volume of the autoclave was occupied by the sol. The autoclave was then closed and heated until a pressure of 1900 pounds per square inch gauge (which was slightly above the critical pressure) was attained, during which time the sol was converted to an ethanol-aquagel in situ. Heating was continued and ethanol-water vapor was released intermittently from the autoclave to maintain the pressure at 1900 pounds per square inch gauge until a temperature of 300° C. was attained. This temperature was above the critical temperature. The vapor in the autoclave was released slowly and the autoclave was then cooled. A silica aerogel of excellent quality was obtained. A slurry of 5 grams of this aerogel in 395 milliliters of distilled water had a specific conductivity of $1.14 \times 10^{-5}$ reciprocal ohms at 26° C., corresponding to a sodium sulfate content of less than 0.1%.

*Example 2*

Nine and seventy-five-hundredths liters of an acidic silica ethanol-aquasol at a temperature of 10° C. and having a colloidal silica content of 9.7%, a sodium sulfate content of 0.3% and ethanol content of 50%, a water content of 40% and containing sufficient free sulfuric acid to provide a pH of about 3.0 (glass electrode), was first filtered through a sand filter and then passed downwardly by gravity flow through a column, 17 millimeters in diameter and 610 millimeters high, of beads of the hydrogen form of "Amberlite" IR–120 cation-exchange resin, which consists of a water-insoluble copolymer of styrene and divinylbenzene having a plurality of nuclear sulfonic acid groups and a capacity of 4.20 me. per gram, at the rate of 15 milliliters per minute. The effluent from the cation-exchange resin was collected until it attained a pH of 2 (glass electrode). A portion of this effluent was tested and was found by flame test to contain a negligible amount of sodium.

The balance of the effluent was next passed downwardly by gravity flow through a column, 17 millimeters in diameter and 610 millimeters high, of beads of the formic acid salt of "Amberlite" IR–45 a weak anion-exchange resin, which resin consists of a water-insoluble copolymer of styrene and divinylbenzene containing a plurality of polyalkylamine groups obtained by reacting diethylene triamine with a chloromethylated styrene-divinyl benzene copolymer and having a capacity of 6.0 me. per gram, at the rate of 15 milliliters per minute. The pH of the effluent from the anion-exchange resin was about 2.9 (glass electrode), and the specific conductivity was $3 \times 10^{-5}$ reciprocal ohms at 25° C. A flame test showed negligible sodium ion, and no precipitate or turbidity was observed when a portion of the effluent was treated with a dilute aqueous barium chloride solution. The specific conductivity of the effluent as given above corresponded to a sodium sulfate content of less than 0.01%.

The above sol was converted to a silica aerogel using the procedure described in the last paragraph of Example 1. An aerogel of excellent quality was obtained. A slurry of 5 grams of this aerogel in 395 milliliters of distilled water had a specific conductivity of $1.25 \times 10^{-5}$ reciprocal ohms at 25° C. which corresponded to a sodium sulfate content of less than 0.1%.

*Example 3*

Four and eight-tenths liters of an acidic silica ethanol-aquasol at a temperature of 5° C. and having a silica content of 9.4% as colloidal silicic acid, a sodium sulfate content of 0.6%, an ethanol content of 45%, a water content of 45% and containing sufficient free sulfuric acid to provide a pH of about 2.9, was first filtered through a sand filter and then passed downwardly by gravity flow through a column, 17 millimeters in diameter and 1220 millimeters high, of a thoroughly mixed bed of particles containing equal capacities of the hydrogen form of "Amberlite" IR–120 cation-exchange resin, which resin consists of a water-insoluble copolymer of styrene and divinylbenzene containing a plurality of nuclear sulfonic acid groups, and the acetic acid salt of "Amberlite" IR–45 a weak anion-exchange resin, which resin consists of a copolymer of styrene and divinylbenzene containing a plurality of polyalkylamine groups obtained by reacting diethylene triamine with a chloromethylated styrene-divinylbenzene copolymer. The rate of flow of the starting sol through the column was controlled to provide an effluent having a pH between 2.8–3.2 (glass electrode). This effluent contained less than 0.01% by sodium sulfate and was stable at 5° C. for at least 48 hours during which time it could be pumped or stored without appreciable change in viscosity.

The above effluent was charged to an autoclave until it occupied 60% of the volume of the autoclave. The autoclave was then closed and heated until the pressure in the autoclave was about 1980 pounds per square inch gauge (which was slightly below the critical pressure of the liquid phase), during which time the sol was converted to an ethanol-aquagel. Heating of the autoclave was continued, while releasing vapor from the autoclave slowly to maintain the above pressure, until the temperature of the gel was about 300° C. which was slightly below the critical temperature of the liquid phase of the gel. This temperature was maintained while vapor was released slowly from the autoclave, and the autoclave was then cooled. A silica aerogel of good quality was obtained, which silica aerogel had a sodium sulfate content below 0.1%.

*Example 4*

An acidic silica ethanol-aquasol was prepared by gradually adding with vigorous stirring about 630 grams of an aqueous solution containing 20% of sodium silicate having an $Na_2O$ to $SiO_2$ ratio of 3.2:1, to 176 grams of an aqueous solution containing 34.6% of $H_2SO_4$. When the pH of the mixture increased to 2.5 (glass electrode), the addition of the sodium silicate solution was stopped and ethanol was added gradually until the ethanol comprised 50% of the resulting sol. All of the above ingredients were stored in glass containers which were immersed in an ice bath before actual mixing of the ingredients took place. The sol obtained was at a temperature of 6° C., and the sodium sulfate crystals which precipitated out upon the addition of the ethanol were filtered from the sol at a temperature of 6° C. The sodium sulfate content of this silica ethanol-aquasol was 0.12%.

The above silica ethanol-aquasol was allowed to flow downwardly by gravity flow at the rate of 4 milliliters per minute through a column, 1 centimeter in diameter and 28 centimeters high, containing particles of the formic acid salt of "Amberlite" IR–45 a weak anion-exchange resin, which resin consists of a water-insoluble copolymer of styrene and divinylbenzene containing a plurality of polyalkylamine groups obtained by reacting diethylene triamine with a chloromethylated styrene-divinyl benzene copolymer and having a capacity of 6.0 me. per gram.

The pH of the sol effluent from this column was about 4.6 (glass electrode) and the specific resistance was 2500 ohms. A 2 milliliter sample of the effluent gave no turbidity when one drop of 1 M aqueous barium chloride solution was added thereto, indicating the efficient removal of sulfate ions.

The effluent from the anion-exchange column was in a condition subject to rapid gelation and so it was immediately passed downwardly by gravity flow through a column, 1 centimeter in diameter and 28 centimeters high, of particles of the hydrogen form of "Dowex" 50 a strong cation-exchange resin, which resin consists of a water-insoluble copolymer of styrene and divinylbenzene containing a plurality of nuclear sulfonic acid groups (which is described in volume 69, page 2830, of the Journal of the American Chemical Society) and having a capacity of 4.25 me. per gram. The rate of flow of the sol through the cation-exchange bed was 4 milliliters per minute, and the effluent from the bed had a pH of about 3.0 (glass electrode) and a specific resistance of 6600 ohms corresponding to a $Na_2SO_4$ content below 0.01%. This effluent when subjected to flame test gave a negligible yellow coloration indicating the substantially complete removal of sodium ion.

The effluent sol from the cation-exchange column was charged to an autoclave and converted to a silica aerogel using the procedure described in the last paragraph of Example 1. A silica aerogel of excellent quality was obtained. This aerogel contained less than 0.1% of electrolyte.

*Example 5*

Experiments were performed as described in Examples 1 through 4 with the exception that the starting sols contained acetone instead of ethanol, but were otherwise identical with the starting sols of the preceding examples. The acidic silica acetone-aquasols after treatment with the anion and cation-exchange resins contained less than 0.01% of $Na_2SO_4$. Also, the silica aerogels prepared from the acidic silica acetone-aquasols were comparable in quality to the aerogels prepared from acidic ethanol-aquasols, and contained less than 0.1% $Na_2SO_4$.

Of the water-insoluble strong cation-exchange materials the preferred are the water-insoluble sulphonated polymerizates of a mixture of a poly-vinyl aryl compound (e.g., the divinyl benzenes, the divinyl toluenes, the divinyl xylenes, the divinyl ar-ethyl benzenes, the divinyl chlorobenzenes, the divinyl-phenyl vinyl ethers, and the like) and a mono-vinyl aryl compound (e.g., styrene, the vinyl toluenes, the vinyl naphthalenes, the vinyl ar-ethyl benzenes, alpha-methyl styrene, the vinyl xylenes, and the like). These materials are well described as is their mode of preparation in U.S. 2,366,007 and U.S. 2,466,675. In sulphonating the polymerizates of a poly-vinyl aryl compound and a mono-vinyl aryl compound various sulphonating agents can be used such as sulfur trioxide, oleum and chlorosulfonic acid. To illustrate their preparation is the following:

Thirty parts by weight of a finely divided polymerizate obtained by polymerizing a mixture of 90 parts by weight of styrene and 10 parts by weight of divinyl benzene is refluxed with 176 parts by weight of chlorosulphonic acid for a few minutes and then the mass is permitted to stand for about two days at room temperature. The reaction mass is then washed with water, filtered and dried. The dried product contained an average of 1.77 sulphonic acid groups per aryl nucleus.

Other water-insoluble strong cation-exchange materials are the water-insoluble phenol-formaldehyde resins having sulfonic acid groups attached to the aryl and/or the methylene nucleus obtained by condensing formaldehyde with phenolsulphonic acid and by sulfonating a phenol-formaldehyde resin or other resins of formaldehyde and hydroxy substituted aromatic hydrocarbons. These materials and the preparation of same are described in U.S. 2,466,675 and U.S. 2,477,328.

This preferred group, i.e., sulphonated polymerizate, of water-insoluble strong cation-exchange resins of the process of this invention are described also in Robert Kunin's "Ion Exchange Resins," Second Edition, published by John Wiley and Sons, Inc., New York, as well as other water-insoluble strong cation exchange resins useful in the process of this invention.

A particularly useful family of water-insoluble weak anion exchange materials containing a plurality of salt-forming nitrogen atoms, which materials in the process of this invention are employed in the form of a volatile organic acid salt thereof, are those described in U.S. 2,591,574. These materials are the water-insoluble reaction products of an alkyl amine containing at least one hydrogen atom on the amine nitrogen atom and the chloromethylated copolymer of a mixture of an aromatic mono-vinyl hydrocarbon (e.g., styrene, vinyl toluene, alpha-methyl styrene, etc.) and an aromatic divinyl hydrocarbon (e.g., divinyl benzene, divinyl toluene, etc.).

This application is a continuation-in-part of co-pending application Serial No. 549,872, filed November 29, 1955, which is a continuation-in-part of application Serial No. 451,299, filed August 20, 1954, both of which applications being now abandoned.

What is claimed is:

1. A process of decreasing the salt content of an acidic silica hydro-organosol containing a salt of a mineral acid and a water soluble alkali silicate which comprises contacting at a temperature below 30° C. an acidic silica hydro-organosol containing from about 5 to 11% by weight of silica, water, from about 25 to 60% by weight of a substantially neutral water-miscible organic liquid consisting of carbon, oxygen and hydrogen atoms, at least 0.1% by weight of a salt of a mineral acid and a water-soluble alkali silicate and a mineral acid in an amount sufficient to provide a pH of 1.8 to 4.0, with the hydrogen form of a water-insoluble, strong cation-exchange material and a water-insoluble salt of a volatile organic acid selected from the group consisting of formic and acetic acids and a water-insoluble, weak anion-exchange material containing a plurality of salt-forming nitrogen atoms, until said hydro-organosol contains less than 0.05% by weight of said salt of a mineral acid and a water soluble alkali silicate, said ion-exchange materials being employed in any desired sequence, said silica hydro-organosol being removed from contact with said anion-exchange material before the pH of the hydro-organosol exceeds about 4.8.

2. A process as in claim 1, but further characterized in that said salt of a mineral acid and a water soluble alkali silicate is sodium sulfate and said organic liquid is ethanol.

3. A process of decreasing the sodium sulfate count of an acidic silica hydro-organosol containing sodium sulfate which comprises contacting at a temperature below 30° C. an acidic silica hydro-organosol containing from about 0.1% to 0.6% by weight of sodium sulfate, from about 5 to 11% by weight of silica as silicic acid, from about 25 to 60% by weight of a substantially neutral, water-miscible organic liquid having a boiling point below that of water at atmospheric pressure and consisting of carbon, hydrogen and oxygen atoms, the remainder of the sol consisting substantially of water and sulfuric acid in an amount to provide a pH of about 2 to 4, with the hydrogen form of a water-insoluble, strong cation-exchange sulfonated polymerizate to remove sodium ions of the sodium sulfate from the sol, thereby obtaining a hydro-organosol having a pH between about 1.8 and 2.5, and thereafter contacting the resulting sol at a temperature below 30° C. with the water-insoluble salt of a volatile organic acid selected from the group consisting of formic and acetic acids and a water-insoluble, weak anion-exchange material containing a plurality of salt-forming nitrogen atoms to replace sulfate ions in the sol with anions of said volatile organic acid, said sol being separated from said anion-exchange material while the pH of the sol is in the range of about 2.8 to 4.0, whereby, a sol is obtained which contains less than 0.025% by weight of sodium sulfate.

4. A process as in claim 3, but further characterized in that the volatile organic acid is formic acid.

5. A process of decreasing the sodium sulfate content of an acidic silica hydro-organosol containing sodium sulfate which comprises contacting at a temperature below 30° C. an acidic silica hydro-organosol containing from about 0.1% to 0.6% by weight of sodium sulfate, from about 5 to 11% by weight of silicic acid, from about 25 to 60% by weight substantially neutral water-miscible organic liquid having a boiling point below that of water at atmospheric pressure and consisting of oxygen, hydrogen and carbon atoms, the remainder of the sol consisting substantially of water and sulfuric acid in an amount to provide a pH between about 2 and 4, with a mixture of the hydrogen form of a water-insoluble, strong cation-exchange sulfonated polymerizate and the water-insoluble salt of a volatile organic acid selected from the group consisting of formic and acetic acids and a water-insoluble, weak anion-exchange material containing a plurality of salt-forming nitrogen atoms to remove sodium cations from said sol and to replace anions of the sodium sulfate with anions of said volatile acid, until the sol contains less than 0.025% by weight of sodium sulfate and controlling the rate of flow of said sol through said mixture of exchange materials so that the sol effluent is at a pH between about 2.7 and 3.5.

6. A process as in claim 5, but further characterized in that the volatile organic acid is formic acid.

7. A process of decreasing the sodium sulfate content of an acidic silica hydro-organosol containing sodium sulfate which comprises contacting at a temperature below 30° C. an acidic silica hydro-organosol containing from about 0.1% to 0.6% by weight of sodium sulfate, from about 5 to 11% by weight of silica, from about 25 to 60% by weight substantially neutral water-miscible organic liquid having a boiling point below that of water at atmospheric pressure and consisting of carbon, hydrogen and oxygen atoms, the remainder consisting substantially of water and sulfuric acid in an amount to provide a pH of about 2 to 4, with the water-insoluble salt of a volatile organic acid selected from the group consisting of formic and acetic acids and a water-insoluble, weak anion-exchange having a plurality of salt-forming nitrogen atoms, until anions of the sodium sulfate in the sol have been exchanged for anions of said volatile organic acid and the pH increases to about 4.4 to 4.8 and thereafter contacting the resulting sol at a temperature below 30° C. and before appreciable change in viscosity occurs, with the hydrogen form of a water-insoluble, strong cation-exhange sulfonated polymerizate until sodium ions of the sodium sulfate in the initial sol are removed by said cation-exchange material and the pH of the sol is about 2.5 to 3.3, whereby a sol is obtained which contains less than 0.025% by weight of sodium sulfate.

8. A process as in claim 7, but further characterized in that said volatile organic acid is formic acid.

9. A process of decreasing the sodium sulfate content of an acidic silica hydro-organosol containing sodium sulfate which comprises contacting, at a temperature below 30° C., an acidic silica hydro-organosol containing at least 0.1% by weight of sodium sulfate, from about 5 to 11% by weight of silica, from about 25 to 60% by weight of a substantially neutral, water-miscible organic liquid consisting of carbon, oxygen and hydrogen atoms, water and an amount of sulfuric acid sufficient to provide a pH of about 2 to 4, with the hydrogen form of a water-insoluble, strong cation-exchange resin containing sulfonic acid groups and the water-insoluble salt of a volatile organic acid selected from the group consisting of formic and acetic acids, and a water-insoluble weak anion-exchange resin containing radicals selected from the group consisting of —$NH_2$, —NHR and $NR_2$ radicals where R is an aliphatic radical, until the hydro-organosol contains less than 0.025% by weight of sodium sulfate, said silica hydro-organosol being removed from contact with said anion-exchange material before the pH of the hydro-organosol exceeds about 4.8.

References Cited in the file of this patent

UNITED STATES PATENTS

| | | |
|---|---|---|
| 2,244,325 | Bird | June 3, 1941 |
| 2,285,449 | Marshall | June 9, 1942 |
| 2,285,477 | White | June 9, 1942 |
| 2,577,484 | Rule | Dec. 5, 1951 |
| 2,588,389 | Iler | Mar. 11, 1952 |
| 2,733,205 | Dalton et al. | Jan. 31, 1956 |

FOREIGN PATENTS

| | | |
|---|---|---|
| 611,914 | Great Britain | Nov. 5, 1948 |